United States Patent

Shumway

[11] 3,890,168
[45] June 17, 1975

[54] EXOTHERMIC WELDING COMPOSITION

[76] Inventor: Harold A. Shumway, 25529 Via Brava, Valencia, Calif. 91355

[22] Filed: Nov. 29, 1972

[21] Appl. No.: 310,330

Related U.S. Application Data

[63] Continuation-in-part of Ser. No. 74,092, Sept. 21, 1970, abandoned.

[52] U.S. Cl. .............. 148/24; 149/37; 148/26; 29/498.5; 228/56
[51] Int. Cl. .............. B23k 35/34; B23k 23/00
[58] Field of Search ........ 148/240.6; 149/37; 75/27, 75/94; 29/498.5, 500, 504

[56] References Cited
UNITED STATES PATENTS

| | | | |
|---|---|---|---|
| 2,282,175 | 5/1942 | Emerson | 75/27 |
| 2,482,093 | 9/1949 | Carlson | 75/27 |
| 2,490,327 | 12/1949 | Soffel | 75/27 |
| 3,033,672 | 5/1962 | Rejdak | 75/27 |
| 3,050,409 | 8/1962 | Bayer | 149/37 |
| 3,089,798 | 5/1963 | Rejdak | 149/37 |
| 3,104,996 | 9/1963 | Boddey | 148/24 |
| 3,116,141 | 12/1963 | Rylander et al. | 75/27 |
| 3,160,537 | 12/1964 | Trafton | 149/37 |
| 3,726,727 | 4/1973 | Ishibashi | 148/24 |
| 3,740,199 | 6/1973 | Gammill | 75/27 |

FOREIGN PATENTS OR APPLICATIONS

| | | | |
|---|---|---|---|
| 1,317,287 | 6/1963 | France | 75/27 |
| 1,508,328 | 4/1971 | Germany | 148/24 |

*Primary Examiner*—Winston A. Douglas
*Assistant Examiner*—Mark Bell

[57] ABSTRACT

A pyro-welding procedure is disclosed herein in which a solid shaped weld element, including a compatible heat generating source, a ferrous weld material source, slag characteristic control materials and alloying agents, is disposed between the opposing surfaces of ferrous structures intended to be joined. Means are provided for igniting the weld element to effect welding of the ferrous structures. Preheating means may be included that may take the form of ignitable strips disposed adjacent the weld element adapted to thermally prepare the opposing surfaces of the ferrous structure for receiving the melted ferrous weld material.

9 Claims, 5 Drawing Figures

PATENTED JUN 17 1975  3,890,168

INVENTOR.
HAROLD A. SHUMWAY
BY
Roger A. Marrs

EXOTHERMIC WELDING COMPOSITION

The present invention is a continuation-in-part of co-pending application Ser. No. 074,092, filed Sept. 21, 1970, and now abandoned.

BACKGROUND OF THE INVENTION

1. Field of the Invention

This invention relates to apparatus, composition, and process for pyro-welding ferrous parts together utilizing an integral, shaped, solid weld element as the source of heat and ferrous weld material. The heat is generated by an exothermic reaction.

2. Brief Description of the Prior Art

Welding is a method for joining of steel parts so as to form an integral structure or construction. It is metallurigical or physical process wherein a weld material is melted in situ between the opposing surfaces of the steel parts to be joined. With an external heat source, such as a torch or the like, the edges of the steel parts or metals to be joined are heated to a temperature sufficient to accomplish the intermetallic fusion or bonding of the melted weld material thereto.

In the past, difficulties have been encountered when practicing conventional welding techniques which are due to the degree of cleanliness required, the shape of the joined edges, the skill of the operator, and the heating facilities. Some prior art devices employ exothermic reactions to produce a weld between ferrous parts. Such prior art devices are disclosed in U.S. Pat. Nos. 2,870,498; 2,932,886; and 3,461,543. However, these prior art processes and devices have not been found entirely desirable since difficulties are experienced in obtaining uniform heating at a suitable temperature and in the degree of skill required to join the metals by effecting simultaneous heating of the base metal workpiece parts and the melting of the weld material. These prior art processes and devices require the presence of a skilled operator, and it is extremely difficult to be assured of a proper weld without employing destructive testing techniques.

Therefore, a need has long existed to provide a simple and relatively economical welding process, composition, and apparatus so that great labor saving can be produced and so that the labor of lesser skilled men than conventionally employed may be used.

SUMMARY OF THE INVENTION

Accordingly, the difficulties and problems encountered with the prior art welding articles and systems are obviated by the present invention which provides a novel apparatus, process, and composition for producing a weldable joint between ferrous parts that includes supporting the opposing wall surfaces of the parts to be joined so as to define a gap therebetween. A solid weld element is nested in the gap. The weld element further includes a suitable ignitable or pyro composition adapted to substantially instantaneously ignite to produce molten ferrous weld material and to heat the opposing wall surfaces so as to receive and fuse with the molten weld material.

One form of the invention may include preheat means which may be a strip of ignitable material separating the weld element from the wall surfaces. The strip burns ahead of the weld element so that the surfaces are adequately prepared to receive the molten ferrous weld material.

Therefore, it is among the primary objects of the present invention to provide a novel welding device, composition, and apparatus utilizing an exothermic reaction to produce the molten ferrous weld metal in situ at the proper temperature and under properly controlled conditions.

Another object of the present invention is to provide a novel exothermic reaction welding process, composition, and apparatus wherein opposing surfaces of ferrous parts may be readily joined in an integral joint by remotely igniting a solid heat generating material without the aid of a welding operator.

Yet another object of the present invention is to provide a novel welding process whereby pyrotechnics may be employed to ignite and form the weld material into an integral connection with opposing surfaces of the steel part without the aid of a welding operator.

Still another object of the present invention is to reduce the cost of welding structures incorporating ferrous parts by eliminating the weld operator and wherein the weld joint is formed by employing ignitable pyrotechnics.

A further object of the present invention resides in providing a preheating means for conditioning the wall portions of ferrous parts intended to be joined so that the surfaces may readily receive and bond with molten weld material subsequently supplied to the preheated areas.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
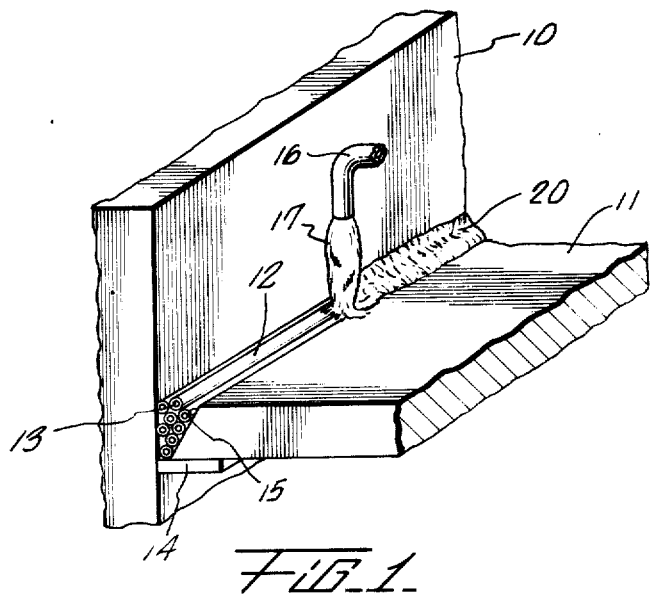
FIG. 1 is a perspective view showing a pair of ferrous plates being joined together by means of a weld joint utilizing exothermic reaction.

Referring to FIG. 1, a pair of ferrous plates intended to be joined together are indicated by the numerals 10 and 11 and are disposed at right angles with respect to each other so as to define a weld gap or cavity between the terminating end of plate 11 and the wall face of part 10. Located within the cavity or gap there is disposed a plurality of solid weld element means which, in the present instance, take the form of rods having a center core of flux material. A typical rod is indicated by numeral 12 and its solid composition is composed of suitable exothermic reactants, slag control materials, ferrous weld material sources, and alloying agents, while the flux material is indicated by numeral 13 and may be any suitable cleansing agent.

For the purpose of practicing the invention, it is preferred that an elongated flange 14 be carried on the surface of the face of part 10 so as to be able to support and hold the terminating end of steel part 11. The flange 14 may be composed of a ceramic material or may be integrally formed with part 10 so as to be available for use. When so formed, flange 14 is integral with 10 adjacent the weld site so as to function as a support. If convenient, the flange 14 may be welded to the surface 10 for temporarily supporting the end of part 11 until the permanent weld has been made.

Preferably, the opposing end surface of steel part 11 facing the opposing surface of part 10 to which it is to be attached, is angled at an approximate 45° so that the weld gap or cavity is substantially V-shaped in cross-section. The angled end surface of steel part 11 is indicated by numeral 15 and runs across the length of the part 11. The weld cavity is filled with the plurality of rods 12 and each rod may be of such a composition that the weld material may be composed of the same material as the base parts to be joined or the weld material may be of a different material altogether. When the weld cavity has been nested with the plurality of rods, the peripheries of the rods will come into contact with the opposing wall surfaces to be joined.

Ignition of the exothermic reaction in the rods may be readily achieved by means of a high temperature torch 16 which expels a jet flame 17 into the weld cavity occupied by the plurality of rods 12. A temperature of 4000°–6000° Fahrenheit ignites the rods to form the molten weld material and in turn to form a permenent weld as indicated by numeral 20. During the melting procedure, the cleansing agent or flux will melt and spread to cleanse the opposing wall surfaces of the parts intended to be joined. At this elevated temperature, it is believed that the weld may proceed at a convenient rate of two inches per second.

Figure 2:
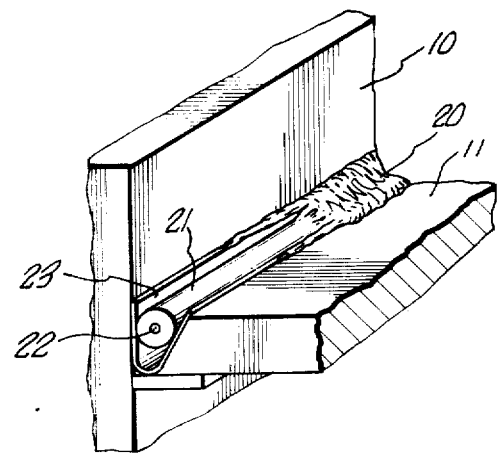
FIG. 2 is a view similar to the view of FIG. 1 illustrating a preheating means separating a solid weld element from the opposing wall surfaces of the parts to be joined.

Referring now to FIG. 2, another embodiment of the present invention is shown wherein the weld element comprises a rod 21 which is of sufficient diameter to occupy the distance between the opposing wall surfaces to be joined. The single rod 21 is of the same composition as previously described and may encase a suitable flux or cleansing agent 22 as a core. Additionally, the embodiment shown in FIG. 2 includes a strip of preheat material indicated by numeral 23 which follows the general outline of the weld cavity by lying between the rod 21 and the opposing surfaces intended to be joined. Also, a portion of the strip material 23 lies against the portion of flange 14 which defines the V-shaped cavity. The preheat strip is intended to burn approximately one inch ahead of the weld metal and is composed of material adapted to burn at the elevated temperature of between 2000°–3000° Fahrenheit. The composition of the preheat strip may include any suitable pyrotechnic composition which may be readily ignited and caused to burn within this temperature range. By burning the material of the strip 23, the opposing wall surfaces of the steel parts are properly heated so as to receive the melted weld material of the rods 12 or 21 when the pyrotechnic composition of the rod or rods are similarly ignited. A weld 20 is produced which comprises not only the weld material formed by the rod or rods but includes the material of strip 23.

It is to be understood that although the solid rods illustrated at 12 or 21 comprise heat generating means in which each rod may include a solid central core which is of a different composition from the surrounding material, the preferred embodiment is one in which the composition of the solid shaped weld element is uniform throughout.

Figure 3:
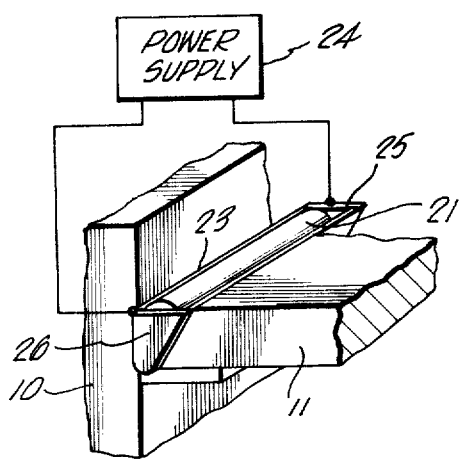
FIG. 3 is another perspective view of the present invention showing the preheat material terminated at its opposite ends in dams or end pieces.

Referring now to FIG. 3, it can be seen that the ignition may take place by means of electricity employing resistant heating techniques. A power supply 24 is electrically connected to a pair of electrodes identified by numerals 25 and 26 which are carried on the ends of the weld cavity, such as by forming with the ends of strip 23. However, it is to be understood that the end pieces 25 and 26 may take the form of end stops or dams for the weld cavity without employment as electrodes. In this instance, the torch 16 may be employed for providing the preheat as well as heat for the weld material. By employing resistance heating techniques, the rod 21 will ignite across its entire length at substantially the same time so as to immediately form the weld. The strip 23 will ignite before the ignition of rod 21. A feature resides in the embodiment of FIG. 3 in that the end pieces or dams 25 and 26 will close off the weld cavity at its opposite ends so as to more precisely confine the molten weld material as it is ignited.

Figure 4:
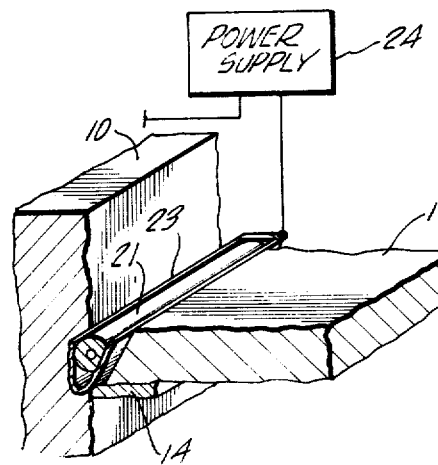
FIG. 4 is another perspective view, in cross-section, of the welding apparatus shown in FIG. 3.

Referring to FIG. 4, the invention as shown in FIG. 3 is substantially illustrated in cross-section wherein it can be seen that the rod 21 substantially occupies the weld cavity defined by the strip of preheat material 23 and that the electrical connections for the power supply to the weld cavity are by means of the preheat strip 23. In this latter instance, it is preferred that the end stops be composed of an insulating material, such as ceramic composition, while the electrical connection of the power supply will be to the side pieces of the electrically conductive preheat strip 23. When energized, the resistance heat will be generated from one end of the preheat strip to its opposite end to instantaneously and simultaneously cause heating and melting of the preheat material followed by ignition of the weld element, rod 21.

It will be understood that, although preheat strip 23 is illustrated in the drawing, the preferred embodiment does not utilize a preheat strip. This is illustrated, for example, in FIG. 5.

Figure 5:
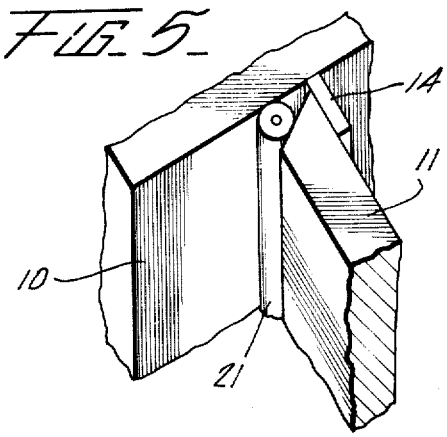
FIG. 5 is a perspective view of a typical installation of the solid weld element carried in a gap having a downwardly opening entrance for vertical welding procedures.

Referring now to FIG. 5 in detail, it can be seen that the welding process and apparatus of the present invention will operate in conjunction with overhead sections wherein the opening to the weld cavity faces in a downward direction. In such instances, the rod 21 may be forced into the cavity so that its peripheral surfaces will be in interfering relationship with the upwardly tapering walls of the cavity. Since the wall surface of plate 11 is angularly disposed with respect to the surface of plate 10, the entrance to the cavity is substantially large compared to the bottom of the cavity so that rod may be placed in an interference type fit so that it will be temporarily retained in the cavity during the ignition and melting period. Also, if it is desired to retain the rod in place without the use of an interference fit, it is conceivable to use a suitable adhesive or bonding agent for temporarily restraining the rod in the cavity.

The weld element 21 may be used within a cavity as previously described or may be used in connection with butt joints where a cavity is not defined. In fact, the weld rod 21 as well as the plurality of rods may also be used in connection with butt joints. When a cavity is defined either by the opposing surfaces of the metal parts to be joined, or the V-shaped cross-sectional strip 23, it is preferred to employ the back-up plate 14 so as to keep the weld from dropping out from between the opposing wall surfaces. It is to be understood that such a back-up plate is conventional in the art, and it may be readily adhered to the metal part by an suitable means, such as spot welding or adhesive bonding.

It is also to be understood that the pair of metal parts being joined may be of any metal composition and that the present invention is not limited to steel parts. Also, the composition of the weld element may include any suitable controlling agents for determining the rate of burn, composition of slag, and weld material in accordance with the concept of the invention. Black iron oxide, $Fe_3O_4$, the aluminum will serve as an adequate heat generating agent or material. The flux, if used, may be of any suitable composition and may take the composition of titanium oxide and lime, borox and flint glass.

In actual operation, a permanent weld may be produced by initially placing a weld element into a prepared weld cavity between the opposing wall surfaces of ferrous parts intended to be joined. Each of the weld elements contains an intimate admixture of exothermic material, slag control material, and alloying material. The exothermic reaction causes the formation of molten ferrous material as a product of the reaction. Once the molten weld material has been formed, it will fuse with the opposing wall surfaces of the ferrous parts. An operator is not needed to precisely control the temperature or the flow of molten weld material since the control of the weld material is substantially dictated by the preparation of the weld site and the positioning of the preformed weld element. Therefore, labor costs are greatly reduced and a considerable time saving is achieved in the construction of ferrous products. This is especially evident in the building and construction trades wherein the frames of high rise buildings are of steel construction with many welds at crucial locations.

The problem of producing structurally sound ferrous welds quickly, cheaply, and with semiskilled or unskilled labor had not previously been satisfactorily solved. Various thermetic welding compositions, devices, and procedures have been proposed; generally, however, these procedures entail using a thermetic reaction as the source of heat to replace the more conventional electrical arc or gas flame heat source. One conventional procedure employs the thermetic reaction to produce a molten pool of iron in a crucible. The molten pool of iron is then conducted from the crucible to the welding site where the heat contained within the molten metal is sufficient to produce fusion with the parent metal structure so as to form the weld. Using conventional thermetic admixture of iron oxide ($Fe_3O_4$ which is a stable form of iron oxide, including both ferrous oxide and ferric oxide and which is black in color) and aluminum turnings in a loose admixture produces a weld that is splattered considerably and is an admixture of aluminum oxide, glass or slag with iron and included voids. The weld has no significant structural strentgh and is essentially valueless.

According to the present invention, it has been determined that the inclusion of materials that reduce the melting point of the slag or glass to at or below the melting point of the ferrous metal contributes to the production of a weld which is free of glass or slag and is substantially void free. It has been found that the inclusion of calcium, silicon, and magnesium materials, as described more particularly hereinafter, results in the depression of the melting point of the slag to a value approximately equal to that of the ferrous weld metal. The density of the resultant slag or glass is such that it floats out of the weld while the weld material is still molten. The particular compound or alloy form in which the slag melting point depressant materials are supplied is not particularly critical so long as they react to form the slag control compounds at the reaction temperatures provided by the exothermic reactants. In general, calcium, silicon, and magnesium have been found to be effective slag melting point depressants. One convenient form for the provision of calcium and silicon is to use the compound calcium silicide. This material absorbs a substantial amount of heat in reacting to the corresponding calcium and silicon oxides. In order to insure a hot enough environment to produce a good weld additional materials, such as potassium perchlorate and potassium dichromate, are added to the admixture. Pure metallic calcium is dangerous to handle, particularly in finely divided form because of its tendency to react with moisture in the air; so for safety reasons, calcium may be provided in the form of a suitable calcium aluminum alloy which does not exhibit these dangerous properties. One such suitable calcium alloy is that composed of an admixture of 80 percent by weight calcium and 20 percent by weight aluminum.

The glass or slag is often quite viscous at temperatures approximately the melting point of the ferrous metal. In order to render the slag less viscous, calcium fluoride may be added. Calcium fluoride does not enter into the reaction at the temperatures involved in a thermetic reaction. Calcium fluoride merely changes phase from the solid to the liquid and then back to the solid phase again. The visible effect of including calcium fluoride in the weld is that it produces a more homogeneous slag free weld, which appears to have a polished surfce. In handling calcium fluoride in the finely divided state care must be taken to prevent this material from picking up water out of the atmosphere. The presence of water in the weld element tends to produce voids in the weld and the extreme it will cause the weld material to explode and splatter out of the weld cavity.

The physical form of the materials comprising the weld element and the weld element itself has been found to be of importance in producing a satisfactory weld. The materials that go into the weld element should be finely divided and thoroughly blended. In general, the materials should be reduced to such a size that they will all pass through a 100 mesh Tyler screen. Preferably the aluminum is of such a size that it will pass through a 200 mesh Tyler screen. When a calcium aluminum alloy is employed, it has been found that the coarser fractions may be of such a size that they will pass through a 32 mesh Tyler screen but will be retained on an 80 mesh Tyler screen. Preferably, however, the major proportion of this calcium aluminum alloy will pass through an 80 mesh Tyler screen. The blending of the materials should be such that each portion of the weld element has substantially the same characteristics.

The blended loose powder form of the composition occupies approximately 50 percent of its theoretical volume. One hundred percent of its theoretical volume is the volume occupied by the material alone without any voids. The material should be compressed to a value of from about 60 to 80 percent of its theoretical volume and preferably from about 60 to 70 percent of its theoretical volume. Compressing the admixture to more than about 80 percent of its theoretical volume sedates the exothermic reaction to the point where a satisfactory weld cannot be achieved. Compaacting the loose powder form of the composition into a solid shaped article accomplishes at least three things. The shaped article is easier to handle than the loose powder. The heat generated by the weld element is concentrated since the same heat is generated within a smaller space. The compaction expels air and the moisture contained in that air from the interior of the weld element. The presence of air within the weld element promotes the formation of voids in the weld and causes splattering of the weld material during the formation of the weld.

Preferably the composition in its powdered form either during the blending operation or just prior to the compression step is subjected to heating, vacuum, nitrogen purge, or some combination of these treatments so as to expel moisture and air from the powder composition. It is particularly important that moisture be removed because the steam generated by the presence of moisture during the welding operation seriously impairs the quality of the weld by forming voids and by splattering material out of the weld cavity.

The problem of the production of voids and splattering of material dictates that gas evolving reactants must be excluded insofar as possible from the composition of the weld element. For this reason, exothermic reactants that include nitrogen or hydrogen producing materials cannot be used. Potassium perchlorate and potassium dichromate generate some gas during the reaction, as indicated by the presence of smoke evolving from the weld site when these materials are present in the weld element. It has been determined, however, that the volatilization of the potassium takes place under such conditions that it does not tend to form voids or cause splattering of the weld material. For this reason, small amounts of these materials may be tolerated in the weld element. The weld element should be stored and handled in a dry environment so as to prevent it from picking up water out of the atmosphere.

It has been found that the composition must be very carefully balanced to substantially stoichiometric values if a satisfactory weld is to be achieved. It is partly for this reason that composite welding elements wherein the composition of various segments of the welding element differ from one another have proven to be very difficult to use. If the stoichiometry of the reaction is such that an excess of reducing agent is present, the excess reducing agent will show up as an alloying material in the weld. Where the reducing agent is aluminum, this results in a very brittle weld that can be shattered by a hammer blow. Where there is an excess of metallic oxide, the energy required to heat the excess cools the reaction to such an extent that it is difficult to achieve a satisfactory weld. A 2 percent stoichiometric excess of aluminum will produce a very brittle weld. A 2 percent stoichiometric excess of iron oxide will cool the reaction somewhat but will not render the weld unusable. The 5 percent stoichiometric excess of iron oxide generallly produces an unsatisfactory weld.

In order to produce the desired characteristics that are compatible with the material being welded, it is necessary to include various alloying materials in the weld element. These materials have as their main purpose production of welds having the desired physical characteristics, but they also necessarily enter into the stoichiometry of the exothermic reaction. The chromium contained in potassium dichromate produces an alloying effect. The potassium dichromate itself also increases the heat to the reaction. Magnesium serves as a reducing agent just like the aluminum, except that the net effect of replacing aluminum with magensium results in reducing the temperature of the reaction for a given unit volume of weld element. The inclusion of alloying materials in the form of metallic oxides, such as nickel oxide and molybdenum oxide, provides materials that react like the iron oxide except as with the magnesium the temperature of the reaction for a given unit volume of the weld element is reduced. The calcium and silicon materials absorb heat and to that extent tend to cool the reaction. Materials that pass through the reaction substantially unaltered, such as calcium fluoride or carbon, merely absorb heat and to that extent tend to cool the reaction. The following formulations have been found to be effective in producing satisfactory pyro-welds.

TABLE

|  | I Wt. % | II Wt. % | III Wt. % | IV Wt. % | V Wt. % |
|---|---|---|---|---|---|
| $Fe_3O_4$* | 66.0 | 71.0 | 72.0 | 70.0 | 57.2 |
| Al | 13.2 | 12.5 | 10.5 | 12.0 | 11.4 |
| Mg |  |  | 4.5 | 2.0 | 1.9 |
| $CaSi_2$ | 1.5 |  | 4.5 | 3.0 | 3.8 |
| Ca/Al** | 10.2 | 16.5 | 8.5 | 10.0 | 9.5 |
| $CaF_2$ |  |  |  | 2.5 | 3.7 |
| $K_2Cr_2O_7$ | 4.6 |  |  |  | 7.6 |
| $Ni_2O_3$ | 2.0 |  |  |  |  |
| $KClO_4$ | 2.5 |  |  |  |  |
| Mn*** |  |  |  | 0.5 | 1.8 |
| Cr**** |  |  |  |  | 1.8 |
| $MoO_3$ |  |  |  |  | 0.8 |
| C***** |  |  |  |  | 0.5 |

*Stable, black mixture of iron oxides derived from millscale
**Calcium-aluminum alloy, 80% Ca, 20% Al by weight
***High carbon ferromanganese
****High carbon ferrochrome
*****Graphite powder The composition of formula V produces a hardfacing alloy deposit. The material of formula IV produces a weld material that has the characteristics similar to 1015 or 1010 structural steel. The weld produced utilizing a weld element having the composition of formula II contains a small amount of slag included in the weld. This weld is not as satisfactory as those of other compositions.

A weld produced utilizing a weld element composed of the formulation I was analyzed and was found to have the following composition by weight: carbon - 0.04, chromium -1.24%, nickel - 0.67, silicon - 1.93, phosphorous - 0.024, sulfur - 0.028, aluminum - 0.50, and the balance iron. This weld was slag free and was very hard and dense. The slag was deposited on the top of the weld and was easily chipped off. This weld was tested structurally and was found to have an ultimate strength of 117,890 pounds per square inch and a yeild of 89,430 pounds per square inch. The weld exhibited 7 percent elongation and 8.9 percent area reduction. The carbon content of the weld apparently occurs as an impurity from the iron oxide. The iron oxide is derived from mill scale which contains a proportion of carbon. The phosphorous and sulfur apparently also came from the same source. It does not appear that these elements migrated into the weld from the two parent structural steel plates that were joined together by the weld.

In general, the reactants in these formulations appear in the final weld product as follows: the aluminum, magnesium, calcium, and silicon appear as the corresponding oxides in the slag which is glass like in its characteristics; the calcium fluoride appears in the slag; the iron, chromium, nickel, manganese, molybdenum, and carbon appear in the weld metal alloyed together; the potassium is volatilized and disappears from the soild phase at the site of the weld; and some aluminum and silicon appear in the weld metal as alloying ingredients.

The above formulations may be varied over wide ranges provided that the stoichiometry is carefully observed so that the reducing agents are carefully balanced against the other reactants, and the reactants providing the exothermic reaction are present in quantities sufficient to produce the heat required to provide a good weld. The alloying materials may be varied as desired to produce in the completed weld whatever predetermined characteristics are needed. In general, the attempt is usually made to produce a weld having approximately the same characteristics as the parent metal to which the weld is applied. The formulation I in the above table is, for example, very much like armor plate in its characteristics and is particularly useful in welding armor plate structures. Suitable reactants for alloying purposes include the oxides; for example, nickel, chromium, manganese, molybdenum, tungsten, cobalt, vanadium, and the like. These materials are included in the proportions necessary to provide the desired amount of alloying agent in the final weld. These materials may also be provided in the metallic form either alone or alloyed with one another as desired. These materials must be accounted for in the stoichiometry of the formulation in order to avoid a formulation in which there is an excess or a deficiency of reducing agent. Carbon may be provided in the elemental form as, for example, graphite, or it may be included in some other alloy, such as high carbon ferromanganese. Carbon also occurs as an impurity in the commercially available iron oxide. The mixture of iron oxides that is preferred for use in this invention is that having the approximately formula $Fe_3O_4$. The exothermic reaction is provided primarily by the iron oxide and elemental aluminum. The exact proportions of iron oxide to aluminum must be adjusted in view of the other ingredients in the formulation so as to achieve a stoichiometric balance; however, reducing the elemental aluminum concentration below about 9 weight percent generally produces a reaction that is not hot enough to achieve a satisfactory weld. Likewise, reducing the iron oxide below about 50 weight percent produces a reaction that is not hot enough to accomplish the desired weld. In general, the iron oxide and aluminum combined should account for not less than about 65 weight percent of the total formulation. In general, the combined elemental aluminum and iron should not exceed about 85 weight percent of the total formulation. The elemental aluminum should not exceed about 15 weight percent of the total formulation. Quantities in excess of this amount tend to produce a slag that is so high in aluminum oxide that its melting point is greatly in excess of that of the ferrous metal. This tends to produce slag inclusions in the weld. The materials, such as magnesium, calcium, and silicon that are added to depress the melting point of the slag are generally approximately equal in weight percent to the elemental aluminum. In general, the combined weight percentage of the slag melting point depressants does not vary from the weight percentage of the elemental aluminum by more than about 5 percent and preferably by no more than about 3 percent. Magnesium, calcium, and silicon have been found to be effective slag melting point depresants. The silicon is very effective but because it reacts slowly it tends to appear as an alloying agent in the weld where it reduces the ductility of the metal. For applications where it is desired to have a ductile weld material, it is necessary to reduce the quantity of silicon and to compensate by increasing the quantity of calcium and magnesium. In general, the slag melting point depressants range from about 5 to 20 weight percent of the total formulation and preferably from about 9 to 15 weight percent of the total composition. The melting point depressants are all materials, the oxides of which form glasses. In general, calcium, when used as one of the glass-forming slag melting point depressants, is present in amounts ranging from about 2 to 15 weight percent and preferably from about 5 to 10 weight percent. When present as a glass forming slag melting point depressant, silicon is generally provided in quantities not exceeding about 5 weight percent. When present as a glass-forming slag melting point depressant, magnesium is generally not provided in amounts exceeding about 10 weight percent and preferably not more than about 5 weight percent. Like the alloying materials, calcium fluoride is provided in a predetermined effective amount to achieve whatever degree of fluidity is desired in the molten slag. Other slag fluidizers may be employed if desired. In addition to depressing the melting point of the slag, the calcium, magnesium, and silicon also apparently decrease the density of the slag so that it rises more rapidly through the molten metal in the weld. When it is desired to use oxidizing agents, such as potassium dichromate and potassium perchlorate, to increase the heat generated by the exothermic reaction, these materials are provided in effective amounts as may be required to achieve the desired temperature. In general the combined weight of such oxidizing agents should not exceed about 10 percent by weight of the total formulation.

The materials included in the formulation have several characteristics in common. They are all powdered materials capable of being compacted in admixture with one another into a structurally coherent integral shaped article for use as a weld element. These finely divided materials do not, with the sole exception of the oxidizing agents, give off volatile materials at the reaction temperatures encountered in these formulations. Organic materials are not included in these formulations because they tend to evolve gases at the reaction temperatures here involved. In general the reaction temperatures of these formulations are from about 4000° to 6000° Fahrenheit.

The rate at which the weld element burns is increased by compression over the rate at which the loose powder burns. The rate at which a weld element burns increases with increasing mass, apparently because of a greater concentration of heat at the flame propagation face. In general, the formulas set forth in the above table burn at rates of from about 1 to 3 inches per second.

What is claimed is:

1. A stoichiometrically balanced; homogeneously admixed exothermic welding composition comprising the ingredients: from about 65 to 85 weight percent of an admixture of powdered elemental aluminum and powdered iron oxide with from about 9 to 15 weight percent of said composition being said powdered elemental aluminum, from about 5 to 20 weight percent of powdered glass-forming slag melting poing depressants selected from the group consisting of calcium, silicon and magnesium materials which during welding yield calcium, silicon and/ or magnesium, and an amount of selected powdered alloying agents effective to form a predetermined alloy, said composition being compressed to between about 60 and 80 percent of its theoretical volume whereby the quantity of entrained air in said composition is mimized.

2. An exothermic welding composition of claim 1 wherein the ingredients are selected from those inorganic reagents that do not evolve any substantial amounts of gases at the reaction temperature of said exothermic welding composition.

3. An exothermic welding composition of claim 1 including an amount of powdered calcium fluoride effective to reduce to a predetermined value the viscosity of a slag formed by the burning of said exothermic welding composition.

4. An exothermic welding composition of claim 1 including an amount of powdered oxidizing reagent effective to increase to a predetermined value the heat generated by the burning of said exothermic welding composition.

5. An exothermic welding composition of claim 1 wherein the powdered glass-forming slag melting point depressant includes calcium.

6. An exothermic welding composition of claim 1 wherein the powdered glass-forming slag melting point depressant includes silicon.

7. An exothermic welding composition of claim 1 wherein the powdered glass-forming slag melting point depressant includes magnesium.

8. An exothermic welding composition of claim 1 wherein the powdered glass-forming slag melting point depressant includes calcium silicide.

9. A stoichiometrically balanced, homogeneously admixed exothermic welding composition comprising the ingredients from about 65 to 85 weight percent of an admixture of powdered elemental aluminum and powdered iron oxide, from about 9 to 15 weight percent of said composition being powdered elemental aluminum, an amount of powdered glass-forming slag melting point depressant selected from the group consisting of calcium, silicon and magnesium materials which during welding yield calcium, silicon and/ or magensium sufficient to depress the melting point of the slag produced during the reaction of said exothermic welding composition to approximately the melting point of a metallic weld material produced by said reaction, the combined weight percentage of said powdered glass-forming slag melting point depressant varying from the weight percent of said powdered elemental aluminum by no more than about 5 weight percent, and an amount of powdered alloying agent effective to provide a predetermined weld alloy, said composition being compressed into an integral, structurally coherent weld element.

* * * * *